United States Patent [19]

Combeau

[11] Patent Number: 5,219,149
[45] Date of Patent: Jun. 15, 1993

[54] VALVES FOR FLUID PASSAGE

[76] Inventor: Alberto Combeau, Providencia 1100, of. 1904, Santiago, Chile

[21] Appl. No.: 939,511

[22] Filed: Sep. 3, 1992

Related U.S. Application Data

[63] Continuation-in-part of Ser. No. 630,986, Dec. 24, 1990, abandoned.

[51] Int. Cl.⁵ .............................................. F16K 5/04
[52] U.S. Cl. .................................. 251/309; 251/317; 251/357
[58] Field of Search ............... 251/304, 309, 314, 317, 251/357, 904

[56] References Cited

U.S. PATENT DOCUMENTS

| | | | |
|---|---|---|---|
| 3,783,840 | 1/1974 | Wurzburger | 251/309 X |
| 3,802,457 | 4/1974 | Wurzburger | 251/309 |
| 4,146,055 | 3/1979 | Nydr et al. | 251/904 X |

FOREIGN PATENT DOCUMENTS

| | | | |
|---|---|---|---|
| 292316 | 7/1958 | France | 251/312 |
| 243789 | 1/1947 | Switzerland | 251/314 |
| 3184 | 2/1884 | United Kingdom | 251/304 |

Primary Examiner—John C. Fox
Attorney, Agent, or Firm—Shlesinger, Arkwright & Garvey

[57] ABSTRACT

A valve for fluids with arrangements of O-rings on the mantle (lateral surface) of the valve stem, which permit the utilization of a variety of geometrical shapes of revolution for the design of the stem. This invention makes possible the reduction of the valve component's manufacturing costs as well as the utilization of the said valve in fluid networks of higher pressures than those possible in traditional valves of this kind. The valve comprises a stem which is a revolution volume and its mantle has at least one perforation with at least two openings, at the same level or at different levels; being said mantle of the stem grooved by one or more furrows which lodge respective O-rings, being the said grooves of a closed loop geometry that surrounds the said mantle so that each groove passes at least over one opening of the perforation or over one virtual opening enclosed between two real openings of the same level of the said perforation.

11 Claims, 8 Drawing Sheets

VALVES FOR FLUID PASSAGE

This is a continuation-in-part application of application Ser. No. 07/630,986, filed Dec. 24, 1990, abandoned.

FIELD OF THE INVENTION

The invention is related to improvements introduced in valves for fluid passage or the like. Specifically, these improvements refer to novel arrangements of O-rings on the mantle (lateral surface) of the valve stem, which permit the utilization of a variety of geometrical shapes of revolution for the design of the stem. Additionally, this invention makes it possible to considerably reduce the manufacturing costs of the valve components as well as to utilize said valve in fluid networks of higher pressures than those possible in traditional valves.

DESCRIPTION OF THE RELATED ART

Fluid networks passage taps or valves of the simplest construction, denominated cone valves, have traditionally consisted of a cone-frustum actuator stem, with a transversal pass-through perforation, which fits into a valve body provided with a cone-frustum cavity complementary to said cone-frustum stem. This type of valves is complemented by a shaft which is solidary or assembled to the stem and that ends in a handle.

This type of valve has the general advantage of being able to command the fluid in quite a rapid form, a 90-degree turn being sufficient to move from the closed to the open position, and viceversa. Nevertheless, the cone-frustum shape of the stem of the traditional actuator presents several disadvantages.

One disadvantage of the cone-frustum stems is related to the valve sealing, since said consists of the simple contact between the mantle of the stem and that of the body cavity, thus resulting in a sealing of the rigid type, whereby the internal measures and especially the conicity of the components, must be critical in order to prevent fluid leakage. In fact, many of the cone valves are utilized with gaseous fluids because they do not provoke the dragging of the grease that is usually applied to the stems in order to make up for the deficiences in tolerances. The grease would easily be dragged by liquid fluids, specially at high pressures.

Even if high-precision means of production were available, the use would produce the wearing out of the components, a fact that varies the fitting of the stem in the body of the valve, thus causing fluid leakage towards the network when the valve is in a closed position. A common form of correcting this problem has consisted of providing the valve with an adjustment nut which permits to displace the stem axially so as to decrease the separation between the stem and the cavity of the valve body, with the subsequent dephasing of the stem openings with respect to the inlet and outlet located in the valve body.

Another disadvantage of these valves, derived from the previous one, is related to the working pressures. Because of the type of sealing, rigid and lacking adaptation between the surfaces in sealing contact, it is not possible to use these valves in high-pressure networks because the fluid would seep out through the small space existing between the stem and the valve body, invading the portion of the network where a disconnection of the fluid feed is desired.

An additional disadvantage of these valves relates to the high manufacturing cost, because the utilization of precision machinery is indispensable in order to achieve an acceptable geometric coincidence in the cone-frustum surfaces of the stem and the cavity of the valve body.

Yet another disadvantage deriving from the sealing accomplished in this type of stem is the limited range of materials and manufacturing techniques used to manufacture these valves, as it is relatively impractical to utilize plastic or other synthetic materials and injection techniques, since the components of the resulting valve would have a high cost to ensure a good perfomance under the requirements of many common ASTM standards.

On the other hand, cone valves are, compartively, of a larger volume than the valve proposed in the invention, for a determined diameter of the inlet and outlet, since the latter possesses a preferably cylindrical stem with particular sealing means.

SUMMARY OF THE INVENTION

Basically, the invention is a valve for fluids, of the straight stop type for instance, which has an actuator stem, preferably cylindrical, with at least one perforation of the transversal pass-through type, for instance, to direct the flow from the inlet towards the outlet of the valve body. The cylindrical mantle of said stem is grooved by at least two closed perimetric grooves, whose geometry will depend on the specific function of the valve. The respective O-rings are inserted in each one of the grooves, and produce the sealing between the stem mantle and the surface of the body cavity. The stem adjusts into a valve body provided with a cylindrical cavity complementary to said cylindrical stem. The valve of the invention includes, as in those from the previous art, a shaft which allows rotation of the stem, which ends in a handle. Also, the stem may have shapes other than cylindrical, provided that they are a body of revolution (circular transversal sections).

According to the invention, the disposition of the grooves containing the O-rings defines sealed sectors in the stem mantle, so that the inlets of the fluid in the valve body are isolated from the outlets when the valve is in the closed or in a switching position.

These sealing sectors defined in the mantle of the stem may be of two types, the first type of sector being originated by a groove (and its respective O-ring) that forms a loop surrounding the stem mantle, so that a superior and inferior sector is formed; the second type of sector being originated by a groove (and its respective O-ring) which forms a loop surrounding a region of the stem mantle, so that an island-like sector is produced in the mantle of the said stem.

The variety of applications where the invention may be utilized allows for the consideration of stems different from traditional ones with a cone-frustum shape, since shapes such as hemispheres, cylinders or other shapes of revolution may be used.

Now, it is also possible to use a variety of independent conduits in the same stem or make stacks of portions of stems with perforations in each of these portions.

A first objective of the invention is to provide a valve for fluids, of a simple construction, such as those with a cone-frustum stem, but with improved sealing characteristics.

A second objective of the invention is to have a valve for fluids having a geometry that makes its manufacturing easier and admits less precision without affecting its sealing characteristics, thus decreasing manufacturing costs.

A third objective of the invention is to offer a valve for fluids, of a simple construction, and which permits higher working pressures.

A fourth objective of the invention is to provide a valve for fluids, of a simple construction, which permits to maintain its sealing characteristics at extreme temperatures and utilizing diverse construction materials.

BRIEF DESCRIPTION OF DRAWINGS

FIG. 26 is an enlarged cross-sectional view of detail A.

DETAILED DESCRIPTION OF THE INVENTION

Figure 1:
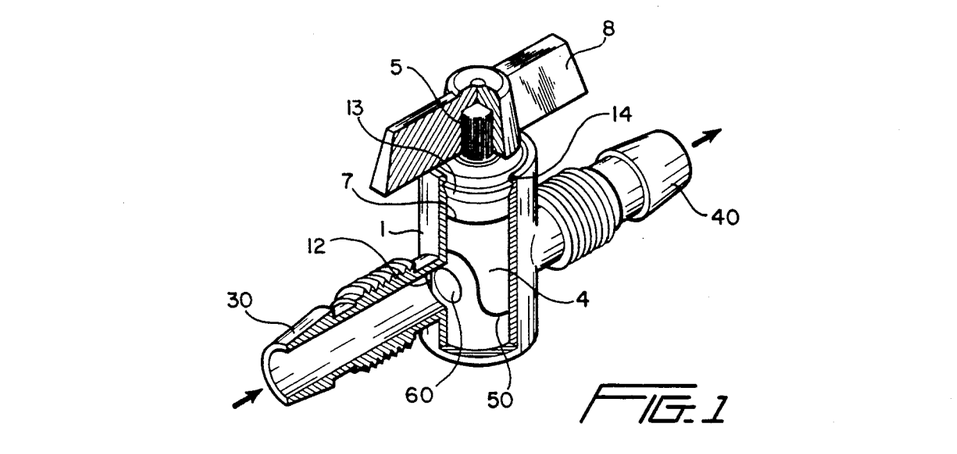
FIG. 1 shows a perspective, in section, of a first embodiment of the valve, according to the invention.

As illustrated in FIG. 1, a first embodiment according to the invention consists of a valve body 1 with at least one inlet 30 and with at least one outlet 40, which are in communication with the cavity 12 of the body 1. The cavity 12 tightly admits an actuator stem 4 provided with a shaft 5 ending in a command handle 8.

In the invention, both the cavity 12 of the body 1, as well as the stem 4 are preferably cylindrical, although they might be cone-frustum shaped, as in the traditional valves.

Said actuator stem 4 includes in its mantle a perforation 60 with at least two openings, so that at least in one position of said stem 4 the openings of the perforation 60 face a couple of ducts 30 and 40 of the valve body 1.

The fastening of the stem 4 to the body 1 of the valve may be of the traditional type or, in the case of plastic valves, it may consist of an anular ledge 13 formed in the mantle of said stem 4 which anchors, in a rotary relationship, into a complementary perimetrical groove 14 formed in the cavity 12 of the valve body 1.

So far, the valve components described appear quite similar to those in a traditional valve, the only variation noticeable being the preferably cylindrical shape of the stem 4 and of the cavity 12 of the valve body 1. Although this arrangement is easier to manufacture, it normally generates the disadvantages of resulting less fully sealed than the cone-frustum stem valves. To overcome this disadvantage, the invention comprises a variety of grooves in the mantle of the stem 4, which allow the installation of at least two O-rings (7 and 50), whereby one of them, that of reference 7, is placed on the upper portion of the cylindrical mantle, its function being to prevent the leakage of the fluid toward the exterior of the valve, through the zone between the stem 4 and the upper opening of the valve body 1; the other O-ring (that of reference 50 in this embodiment), being placed according to a closed curved line with a contour different from that a circumference (closed loop).

In concrete, in the embodiment of FIGS. 1 to 5 wich relate to a simple straight stop valve, composed of an inlet 30 for fluid and an outlet 40 for fluid, having its stem 4 a simple pass-through perforation 60, the O-ring 50 is kept on the cylindrical surface of the stem 4, and substantially over the level of the openings of the perforation 60, with the exception of a region intermediate to said openings where O-ring 50 descends under the level of the openings of perforation 60, to ascend again and reacquire its upper level, thus describing a curve surrounding the projection of the inlet duct 30 (or of the outlet 40), that is to say, surrounding a virtual opening intermediate to ducts 30 and 40, always keeping itself within the groove corresponding to the mantle of the stem 4.

Figure 2:
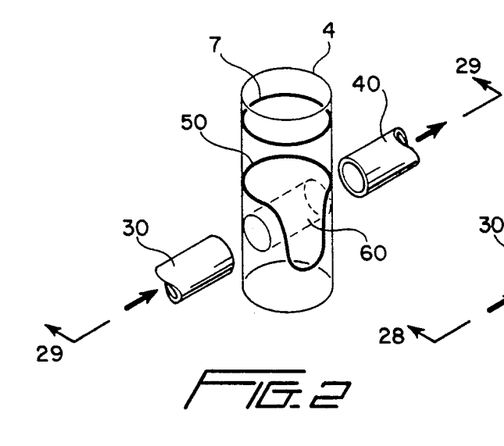
FIG. 2 represents a schematic simplification, also in perspective, of valve of FIG. 1, in an open position.
Figure 3:
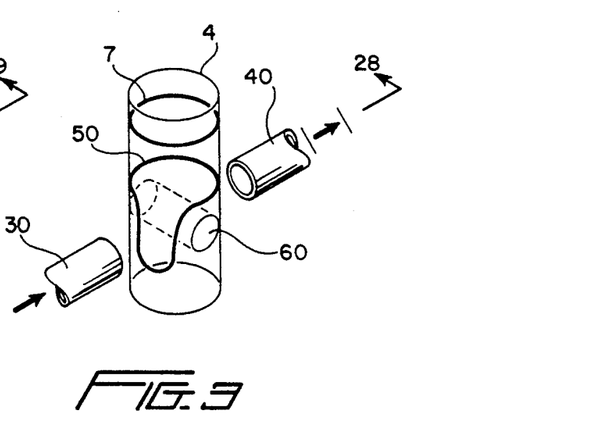
FIG. 3 represents the same simplification as in FIG. 2, but in a closed position.

FIGS. 2 and 3 represent a simplified view of FIG. 1, whereby the stem 4 is shown with the upper O-ring 7 and O-ring 50. Inlet duct 30 and outlet 40 of the fluid, contained in the body 1 (not illustrated), have also been insinuated. Specifically, FIG. 2 shows stem 4 oriented toward an open valve position, in such a way that the inlet of the fluid 30 is facing one of the openings of the perforation 60 of said stem 4, and O-ring 50 surrounds the said opening of perforation 60 in its upper part, the descending part of O-ring 50 being in a position intermediate on the mantle of stem 4 to the present position of inlet 30 and outlet 40 ducts.

In this open valve position, the flow coming out from duct 30 mainly enters through the opening of perforation 60 of the stem 4, coming out on the other end where it is channeled toward outlet 40. Nevertheless, a fraction of the fluid coming out of the inlet 30 floods the mantle of the stem 4 but, given the arrangement of the O-rings, said fluid is restricted to the region comprised below O-ring 50 so that said fraction of fluid can only escape through the outlet 40, a fact that is not inconvenient for the open valve condition.

In the position of closed valve, according to FIG. 3, the stem has been rotated 90 degrees, and perforation 60 is now placed perpendicular to the inlet and outlet 30 and 40, respectively. Under these conditions, the fluid flowing out of inlet 30 can only leak through the space between the mantle of the stem 4 and cavity 12, but only in the region enclosed over O-ring 50 and under O-ring 7. Because of the geometry described by O-ring 50, in this closed valve position, the opening of inlet 30 remains in contact with the area over O-ring 50 and the opening of the outlet 40 remains in contact with the area below said O-ring (or viceversa if the stem 4 is rotated 180 degrees with respect to the position illustrated), so that the fraction of the fluid that may flow into the space between the stem 4 and the valve body 1 can only flood the already described region, which has no communication whatsoever with outlet 40.

In order to visualize the total topology of the O-rings in the stem 4 and its relationship with possible inlet ducts 30, 31, etc., and outlet ducts 40, 41, etc., as well as to visualize the topology of the possible perforations 60, 61, etc., in the stem 4, reference will be made to a symbolic representation consisting of a pseudo-conical projection of the stem 4; the projection focus being located in the upper part of said stem, in such a way that a circular scheme of the whole cylindrical mantle-including its base-is generated. This projection may be understood as an elastic lowering down of the cylindrical wall of the stem 4, which deforms until coinciding with an inferior horizontal plane. In accordance with this representation, concentric circumference represent parallel circumferences on the cylindrical mantle of the stem 4 and radial lines in said symbolic representation correspond to generating segments of said cylindrical mantle.

Inlet 30 (and eventually 31, 32, etc.) will be represented by arrows pointing to the circular segment of the stem 4 representation, at the point where the openings of the perforation 60 are found in open position. Likewise, outlet ducts 40 (and eventually 41, 42, etc.) will be represented by arrows emerging from the circular segment of the stem 4 representation; any of these arrows limited by transversal lines will represent fuid flow interrupted by the valve. Worth noticing is the fact that, according to this representation, the positions closer to the center are equivalent to lower positions in the real stem.

Figure 4:
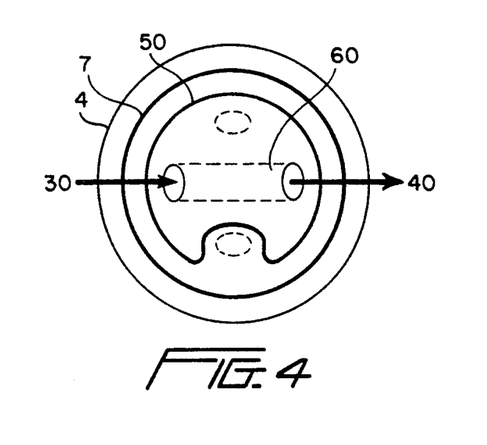
FIG. 4 illustrates a symbolic scheme of FIG. 2.
Figure 5:
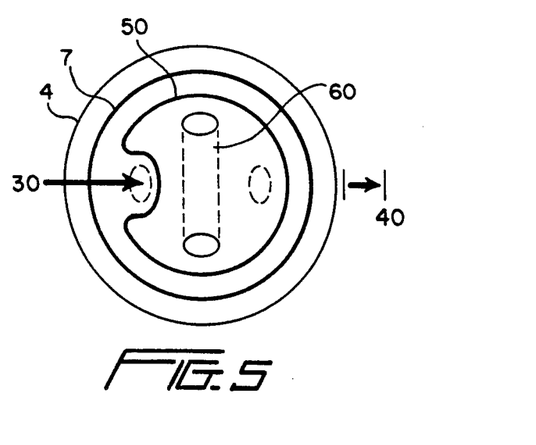
FIG. 5 illustrates a symbolic scheme of FIG. 3.

In accordance with this symbology, FIGS. 4 and 5 reillustrate the situation explained in relation to FIG. 1 and especially in FIGS. 2 and 3. As can be observed in FIG. 4 (open valve), inlet 30 of the fluid is facing one of the openings of perforation 60 of the stem 4 and it comes out on the other end which faces outlet 40. Additionally, there is a clearer view of the area comprised within (below, in the real case), O-ring 50 which, in this open valve position, leaks (communicates) only toward the outlet 40, a fact that does not affect the function in this position.

FIG. 5 shows the valve in a closed position (turned 90 degrees). It is now evident that inlet 30 is facing the descending portion of O-ring 50 (virtual opening), so that the fluid can only invade the area between said O-rings 50 and 7. This area is not is communication either with outlet 40 or the upper end of the step 4 (periphery of the scheme) which corresponds to the environment external to the valve.

Figure 6:
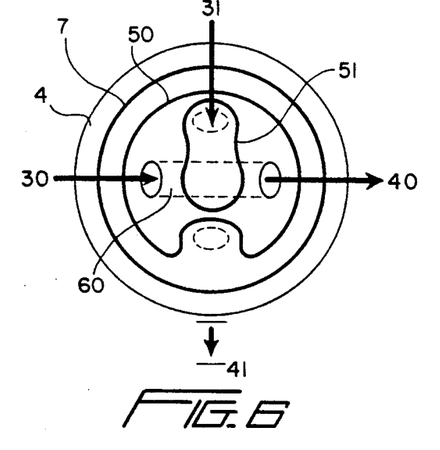
FIG. 6 shows a symbolic scheme of a second embodiment, according to the invention, in a first position.
Figure 7:
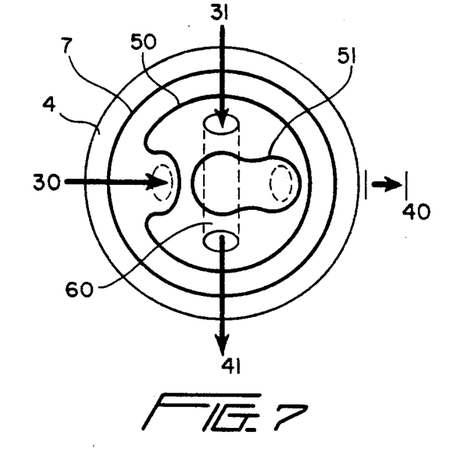
FIG. 7 shows a symbolic scheme of FIG. 6 valve, after a 90-degree rotation.

A second embodiment, within the context of the invention, consists of a four-way "switch valve" which is shown in the symbolic representation of FIGS. 6 and 7. FIG. 6 shows the switch connecting inlet 30 to outlet 40 and isolating inlet 31 from outlet 41. As can be observed, stem 4 has a simple perforation 60 which has only two diametrically opposed openings, located in its mantle. The same as with the first embodiment of FIGS. 1 to 5, stem 4 has an upper perimetric O-ring 7 which prevents the fluid from leaking toward the exterior of the valve and which also has an O-ring 50, placed further down said O-ring 7, which possesses a geometry similar to that described in the first embodiment, that is to say, said O-ring 50 keeps itself over the level of the openings of perforation 60, except for a portion intermediate to them which surrounds the lower part of a virtual opening placed at the same level as the real ones. A third O-ring 51 is placed in a corresponding groove of the mantle of the stem 4, so that it is located below O-ring 50 and passes over a virtual opening diametrically opposed to the virtual opening that defines the irregularity of O-ring 50, descending said O-ring 51 beneath all the other positions of openings (real or virtual) to be found at the same level as those of perforation 60.

As can be seen in FIG. 6, inlet 30 faces one of the openings of perforation 60 in order to communicate the fluid to the other end of said perforation, which faces outlet 40. In this position, inlet 30 leaks to the area of the stem 4 comprehended between O-ring 50 and O-ring 51; this area being also communicated with outlet 40, in such a way that it does not interfere with the function of supplying the passage between inlet 30 and outlet 40. On the other hand, in this position inlet 31 faces the wall of the stem (virtual opening) and the fluid from this inlet may leak into the area comprised solely within O-ring 51, an area which is not in communication with any outlet (nor with any other inlet) of the valve, so that inlet 31 is totally isolated, both from outlet 41 as well as from outlet 40.

FIG. 7 represents the same switching valve of FIG. 6, but in a 90-degree-turn position, so that now inlet 31 has been communicated with outlet 41, and inlet 30 has been isolated from outlet 40. This time, inlet 30 is facing the wall of the stem 4 (now a virtual opening), and it can only leak into the area comprehended between O-rings 7 and 50, an area not communicated with any outlet (nor with any other inlet) of the valve. On the contrary, inlet 31 is now communicated with outlet 41 by means of perforation 60 of stem 4 and the possible leakages compromise only the area encompassed between inlet 31 and outlet 41 ducts, that are those desired to be in communication.

A third embodiment of the invention consists in its application to a drain valve, illustrated in FIGS. 8 to 11. This valve evacuates, every 90 degrees, alternatively from a first inlet 30 or from a second inlet 31, or from both, toward a lower outlet 42. Inlets 30 and 31 are located at 90 degrees and converge on the cylindrical mantle of stem 4. The cylindrical stem 4 is provided with a perforation 61 in the shape of a double elbow with its three branches respectively perpendicular to each other, so that its two access openings are perpendicular and horizontal, and the draining opening is located at the base of the stem, which is always facing outlet 42 in the lower part of the valve body.

As can be seen in FIGS. 8 to 11, this valve has three O-rings: a first upper O-ring 7 located in the uppermost position of the stem 4; a second O-ring 50 is located in a position intermediate to the cylindrical mantle of stem 4 and passes below a virtual opening opposed to one of the horizontal openings of perforation 61, ascending over the level of said openings in the rest of the mantle of the stem 4; a third O-ring 52 is located in a lower position so that it passes over the two horizontal perforations that might be located in a position opposite to each of the horizontal openings.

Figure 8:
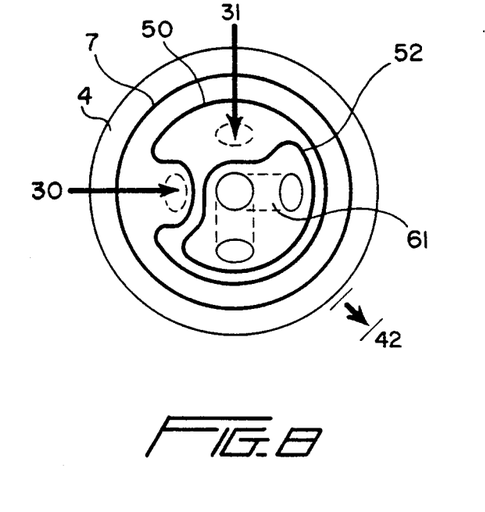
FIG. 8 shows a symbolic scheme of a third embodiment, according to the invention, in a first position.

In this arrangement, FIG. 8 shows a symbolic scheme of the drain valve in a closed position, inlet 30 being faced with the mantle of the stem 4 (virtual opening) so that the flow of said inlet 30 can only leak into the area enclosed between O-rings 7 and 50, wherein there is no opening whatsoever of perforation 61 whereby the fluid may leak. Likewise, inlet 31 is facing another virtual opening of the stem 4, thus being able to flood the area comprised between O-rings 50 and 52, wherein no opening is found through which the fluid may leak.

Figure 9:
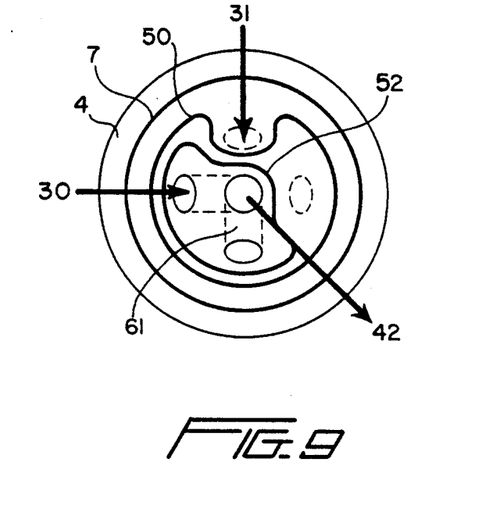
FIG. 9 shows a symbolic scheme of FIG. 8 valve, after a 90-degree-turn.

FIG. 9 represents the same valve of FIG. 8, but with inlet 30 in an open and inlet 31 in a closed position. In these conditions, inlet 30 faces one of the horizontal openings of perforation 61, and the other horizontal opening of the perforation is in a position diametrically opposite to inlet 31. In this manner, inlet 30 is communicated with outlet 42 and it floods an area of the stem 4 located between O-rings 7 and 50, wherein there is no opening through which the fluid might leak.

Figure 10:
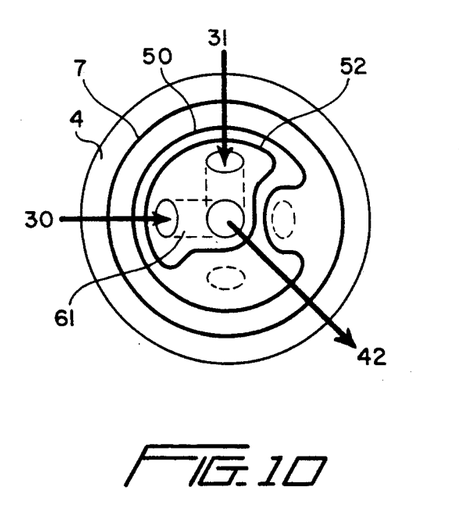
FIG. 10 shows the symbolic scheme of the FIG. 8 valve, after a 180-degree-turn.

FIG. 10 shows the same drain valve of FIG. 8 and 9, but in a position where inlets 30 and 31 are evacuating toward outlet 42, due to the fact that both inlets 30 and 31 are facing respective horizontal openings of perforation 61.

Figure 11:
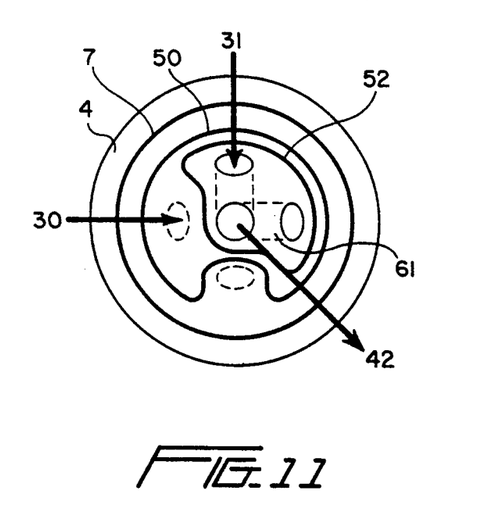
FIG. 11 shows the symbolic scheme of the FIG. 8 valve, after a 270-degree-turn.

FIG. 11 illustrates the same valve of FIGS. 8 to 10, but in a position whereby inlet 31 communicates with outlet 42 and the inlet 30 is obstructed. In this position, one of the horizontal openings of perforation 61 is facing inlet 31 and the other horizontal opening is diametrically opposite to inlet 30, so the latter faces a virtual opening, being able to flood the area between the O-rings 50 and 52, having said area no opening whatsoever whereby the fluid might leak.

Figure 12:
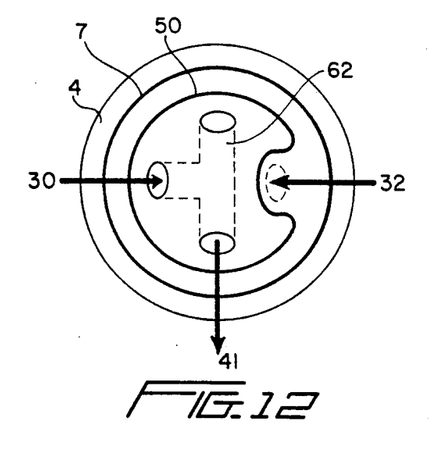
FIG. 12 shows a symbolic scheme of a fourth embodiment, in accordance with the invention, in a first position.
Figure 13:
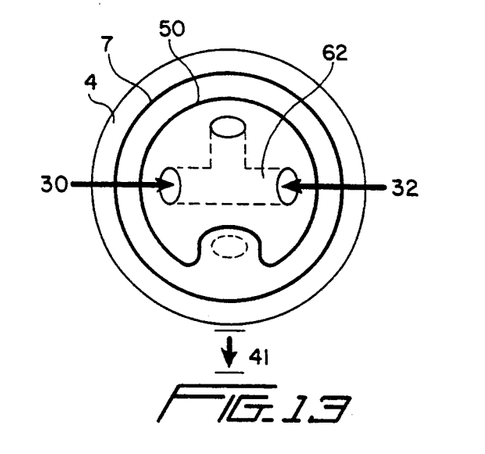
FIG. 13 shows the symbolic scheme of FIG. 12 valve, after a 90-degree-turn.
Figure 14:
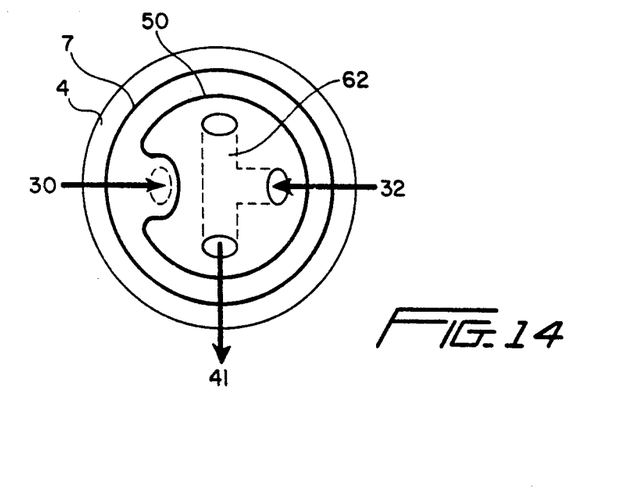
FIG. 14 shows the symbolic scheme of FIG. 12, after a 180-degree turn.
Figure 15:
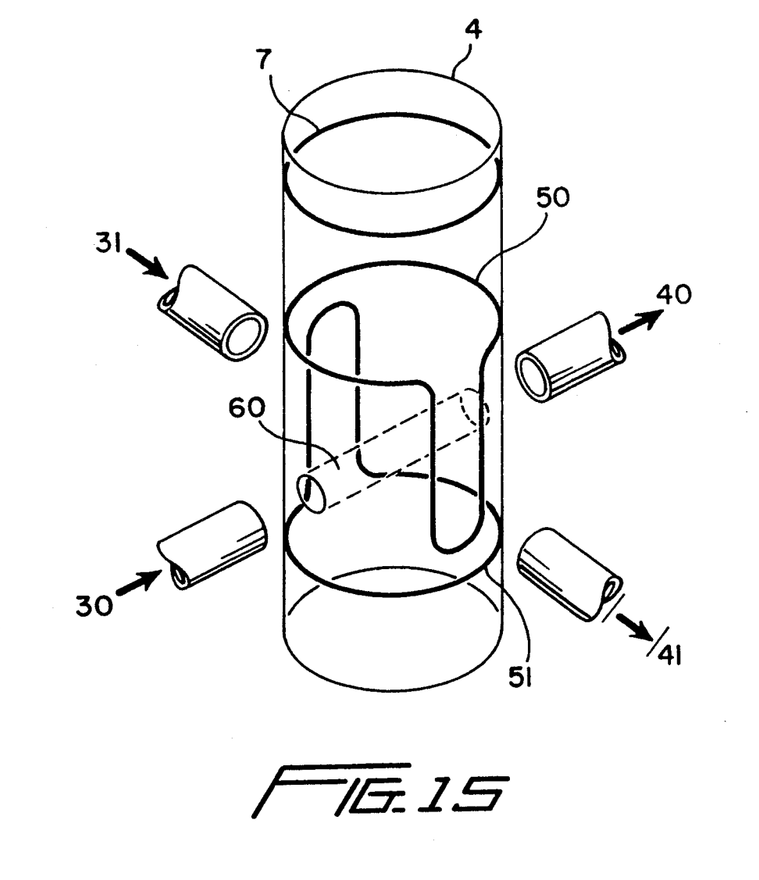
FIGS. 15-16 are perspective a schematic views of FIGS. 6-7.
Figure 16:
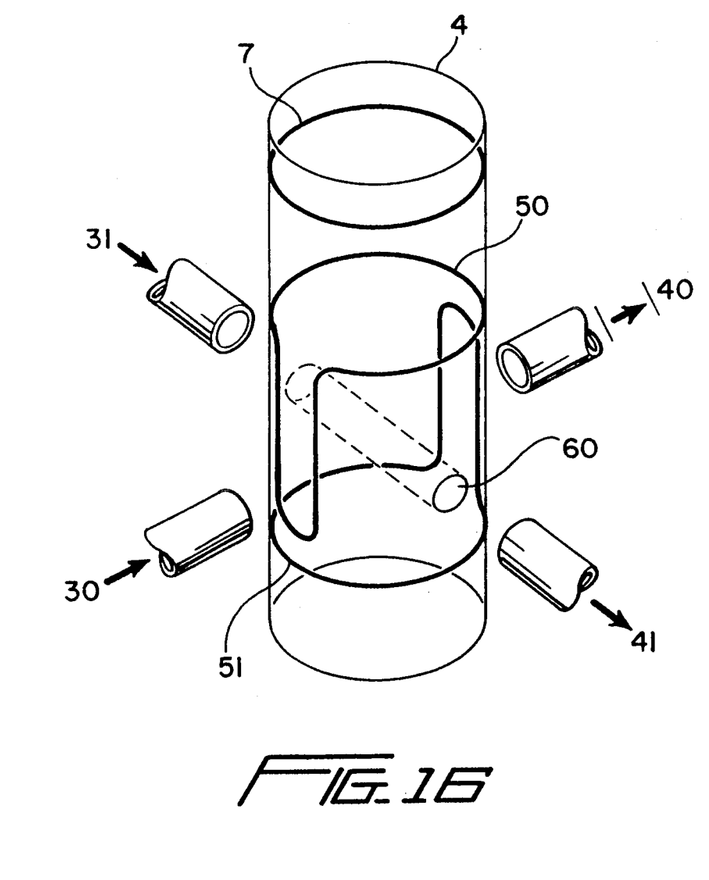
Figure 17:
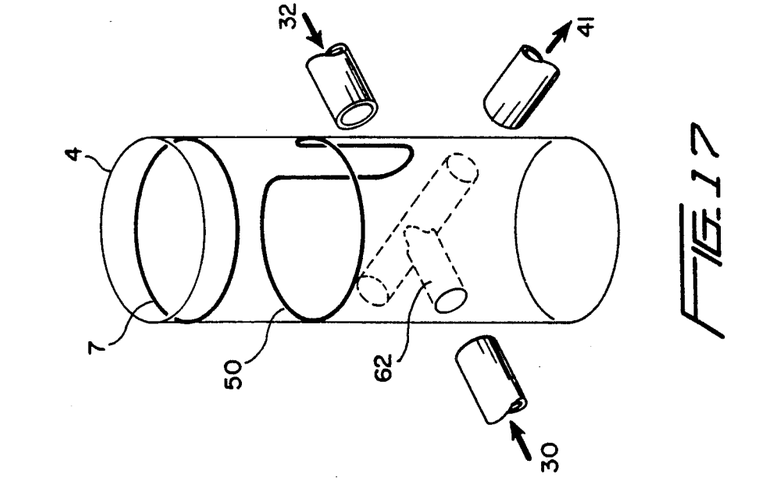
FIGS. 17-19 are schematic perspective views of FIGS. 12-14.
Figure 18:
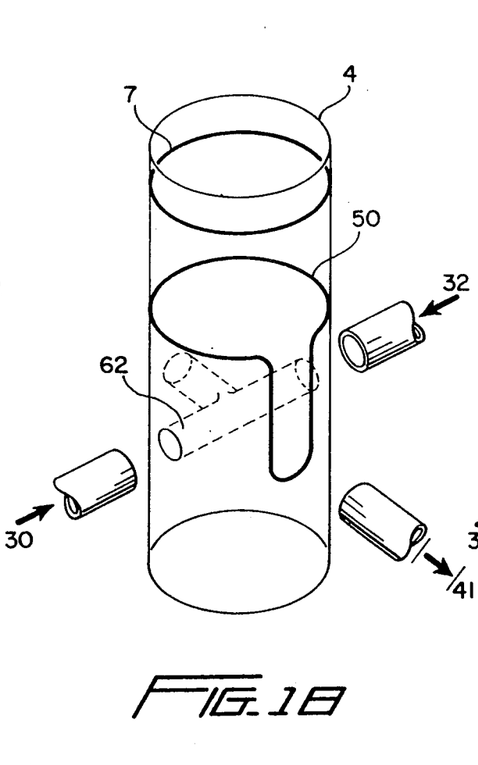
Figure 19:
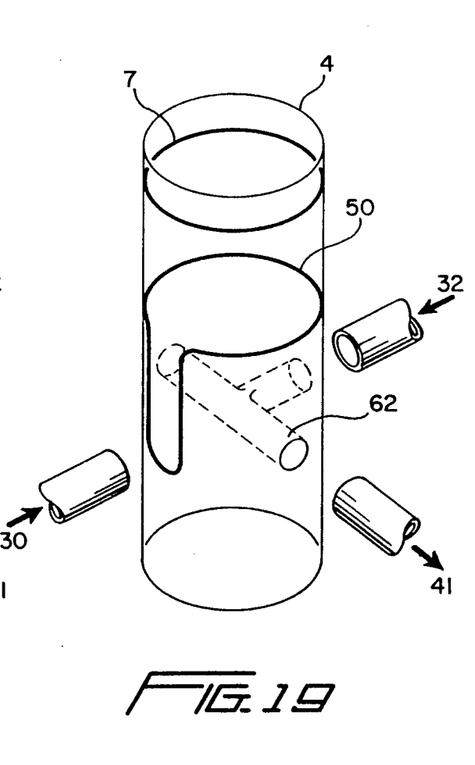
Figure 20:
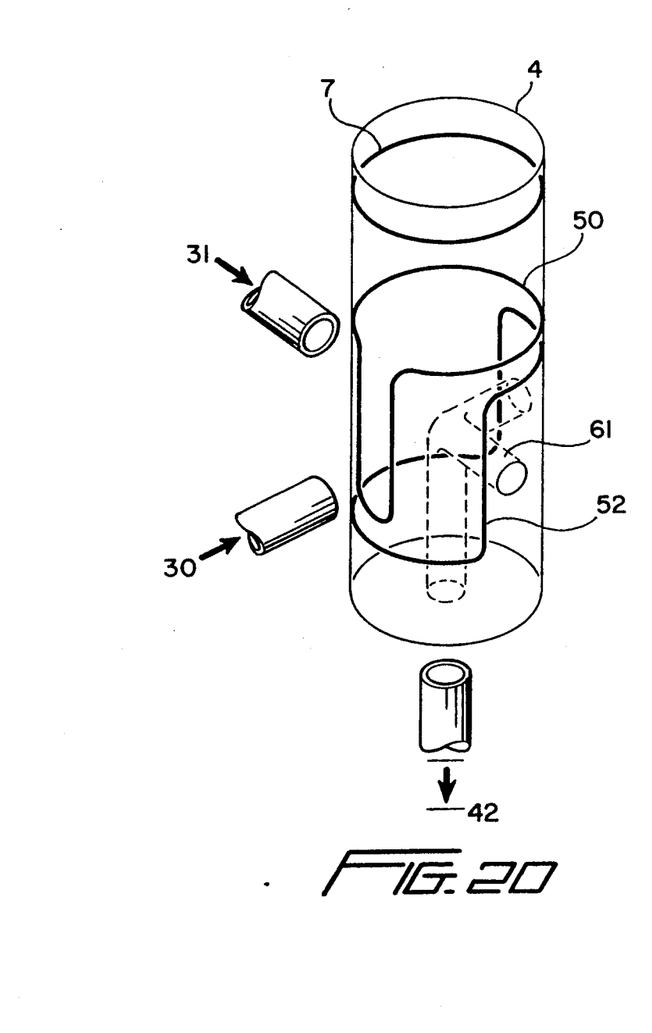
FIGS. 20-23 are schematic perspective views of FIGS. 8-11.
Figure 21:
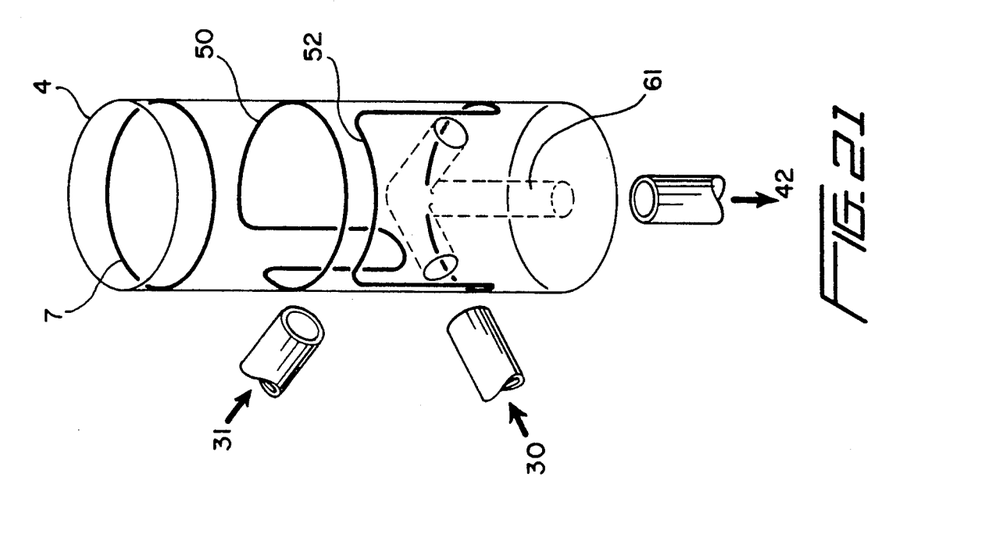
Figure 22:
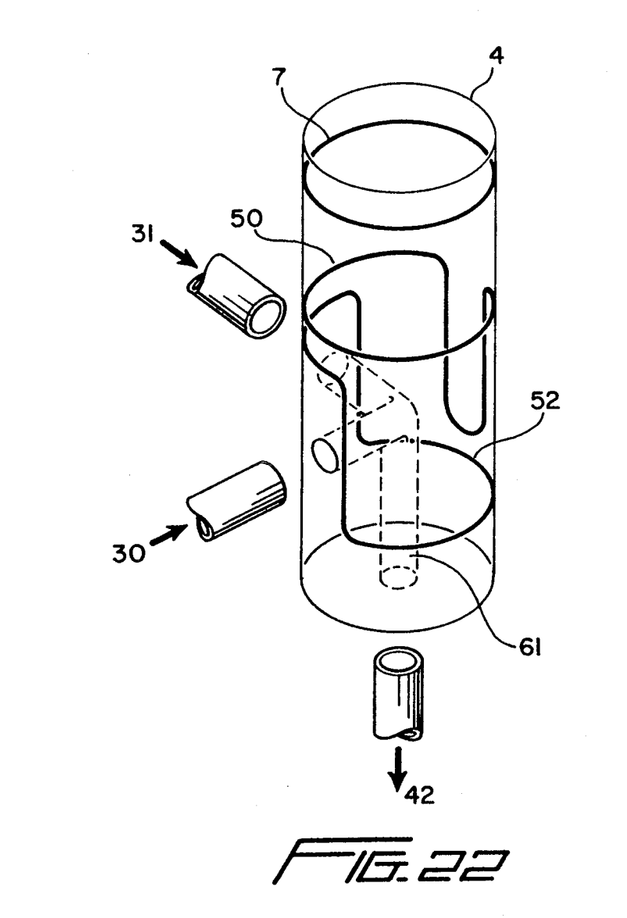
Figure 23:
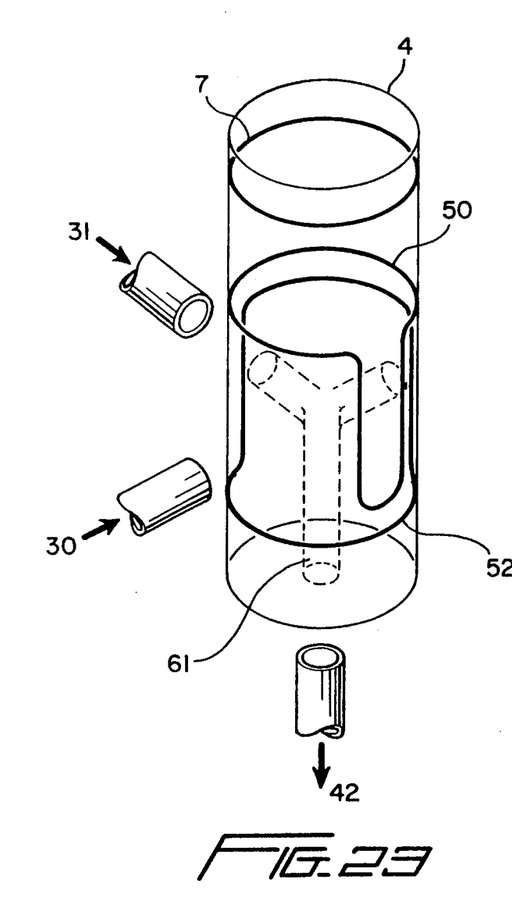

A fourth embodiment of the invention, illustrated in FIG. 12 to 14 is related to a valve of the dairy type, wherein two inlets, 30 and 32, are switched over toward an outlet, or else, both inlets are isolated from outlet 41. This valve is perfectly reversible with regard to the inlets and outlets.

This valve has a stem 4, substantially cylindrical, which possesses a perforation 62 in the shape of a horizontal "T", so that the openings of its three branches are found in the mantle of said stem. The mantle of stem 4 has two O-rings 7 and 50, topologically equivalent to those of the same reference, formerly described. As shown in FIG. 12, the valve is in position of communicating inlet 30 to outlet 41, leaving inlet 32 facing the area located between O-rings 7 and 50, wherein no other duct exists through which the fluid might flow.

If stem 4 is rotated 90 degrees clockwise, as represented in FIG. 13, then the valve closes outlet 41 respect to the flows coming from both inlets 30 and 32. These flows, however, are left facing each other inside perforation 62 and, since the application is to switch two branches of a fluid of the same nature, which are at the same pressure, then this confrontation does not become deleterious to said application.

FIG. 14 shows the same valve after a 90-degree-turn respect to the position of FIG. 13. In this situation, the valve communicates inlet 32 with outlet 41 and blocks inlet 30. As the inlet 30 is facing the area comprised between O-rings 7 and 50, and this area is not communicated with any other duct, then the valve is closed respect to inlet 30.

In these embodiments some ducts 30, 31, etc., may be connected to outlets instead of inlets and some ducts 40, 41, etc., may be connected to inlets instead of outlets, the valve thus being able to serve other uses than the one given as example.

From the previous examples it can be seen that the invention may have multiple expressions and it may be utilized in various valve applications, without it becoming an invention different from the one herein presented and claimed.

Within the obvious variations of the invention it may be pointed out that the stem will be preferably cylindrical, although it may also be cone-frustum or in the shape of any other volume of revolution. The perforation of the stem 4 may have multiple openings, not necessarily orthogonal, and they may be found at various levels of the mantle of said stem, wherein this perforation may or may not be in communication with the lower part of the stem.

In general, the invention involves two sealing arrangements: a first arrangement that may consist of an O-ring (or an upper gasket), which has the objective of preventing the fluid from leaking toward the environment external to the valve through the space between the stem and the cavity that lodges it; a second sealing arrangement, that we call "loop arrangement", may be composed of one or more O-rings inserted in corresponding grooves with a topology that consists in passing over (above) at least one opening (real or virtual) of the perforation of the stem and below the remaining ones. The latter must be understood in its widest sense, since if it were, for example, a valve having several levels of perforation openings in the mantle of the stem, an O-ring may pass, for instance, over an opening in the midlevel, which may also mean its passing over the upper level and pass underneath one or more of the remaining openings (real or virtual) of a lower level, on the condition that no O-ring intersects another.

Figure 24:
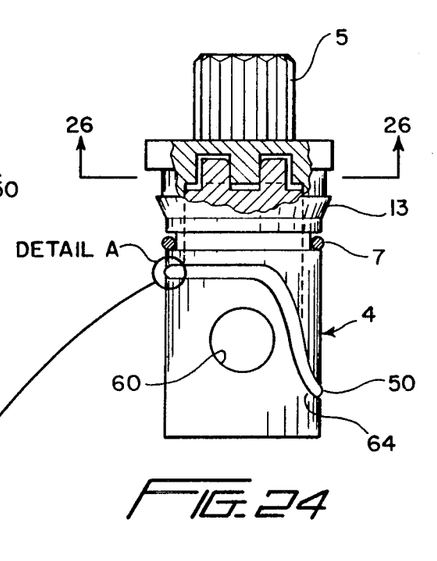
FIG. 24 is a side elevational view of a valve stem.
Figure 25:
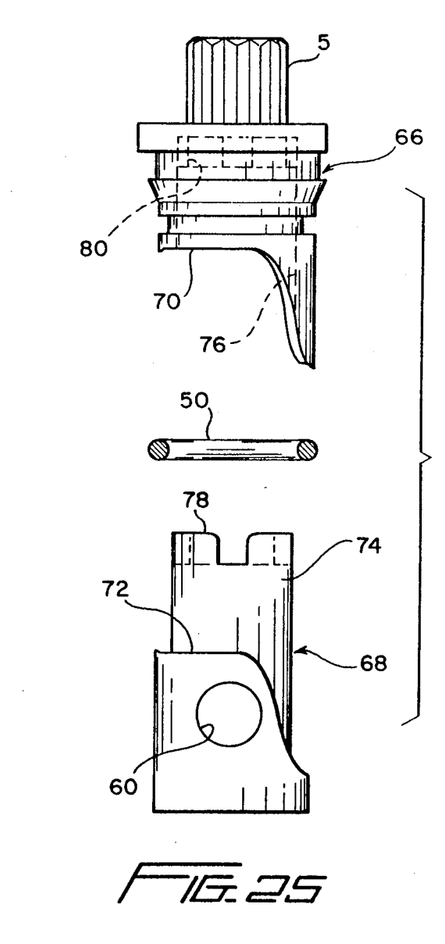
FIG. 25 is an exploded view of FIG. 24.
Figure 26:
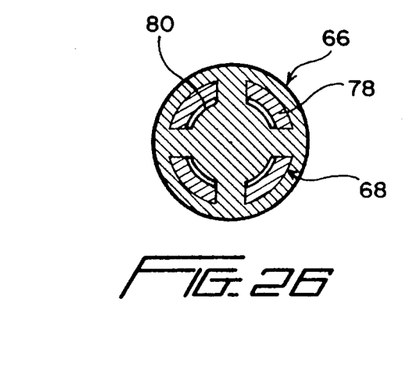
FIG. 26 is a cross-sectional view along line 26-26 in FIG. 24.
Figure 27:
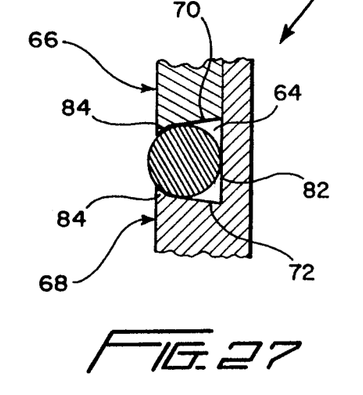
Figure 28:
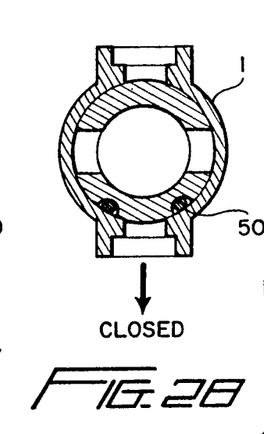
FIG. 28 is a cross-sectional view taken along line 28-28 of FIG. 3.
Figure 29:
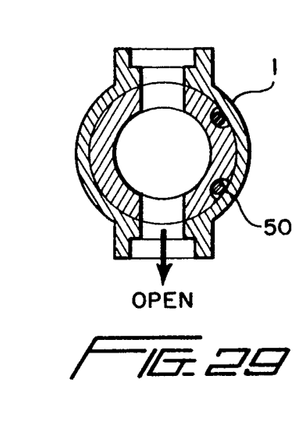
FIG. 29 is a cross-sectional view taken along line 29-29 of FIG. 2.

The stem 4 includes a groove 64 that secures the O-ring 50, as best shown in FIGS. 24 and 27. The stem 4 comprises a female member 66 and a male member 68, as best shown in FIG. 25. The female member 66 includes an outer edge 70 that cooperates with an opposing outer edge 72 disposed in the male member 68 to form the groove 64. The male member 68 has a cylindrical portion that fits into a cooperating cylindrical bore 76 in the female member 66. The male member 68 has a plurality of teeth 78 circumferentially disposed at one end of the cylindrical portion 74, as best shown in FIGS. 25 and 26. The female member 66 includes circumferentially disposed slots 80 at the bottom of the bore 76 that cooperate with the teeth 78 when the members 66 and 68 are assembled together.

The groove 64 is formed when the members 66 and 68 are fitted together, as best shown in FIG. 24. The groove 64 is defined by a base wall 82 that forms a part of the cylindrical portion 74 and the opposing edges 70 and 72. Each of the edges 70 and 72 are inclined inwardly into the groove 64. Each of the edges 70 and 72 further includes a lip portion 84 that is further inclined inwardly into the groove 64. The shape of the groove advantageously retains the O-ring 50 in place.

In view of the two-part structure of the stem 4, the valve 1 is much simpler, less bulky and more cost effective than prior art valves. The two-part structure of the valve 1 advantageously permits construction of the groove 64 wherein the opening is smaller than the radical cross-sectional diameter of the O-ring 50 by means of standard molding processes. If the stem 4 were a single piece, and molded, then the cross-section of the grooves 64 would be at best a square or slightly opened so that the part can be released from the mold. A square or slightly opened groove will not serve its purpose of holding the O-ring in place because the O-ring will be dislodged out of the groove by the fluid when opening or closing the valve. Fluid typically emerges with great speed when the opening or port of the plug just starts facing the body port. This in turn causes high turbulence in the area and also causes a tangential force on the O-ring that tends to separate it from the groove and causing it to be easily caught by the edge of the port and completely unseal it. The specific structure of the groove 64, as best shown in FIG. 27, advantageously avoids this problem.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:

1. A fluid valve, comprising:
   a) a body having a chamber and an inlet opening and an outlet opening communicating with said chamber;
   b) a plug being disposed within said chamber, said plug being rotatable within said chamber about an axis between a closed position and an open position;
   c) said plug including a passageway communicating with said inlet opening and said outlet opening when said plug is in said open position, thereby providing a flowpath for the fluid through said valve;
   d) said inlet opening, said outlet opening and said passageway being disposed along a straight axis when said plug is in said open position;
   e) first seal disposed between said body and said plug;
   f) second seal disposed between said body and said plug, said second seal being spaced apart from said first seal and defining therebetween and said body and said plug a closed volume without said passageway;
   g) said second seal consisting of first and second contiguous portions;
   h) said first contiguous portion being disposed above said inlet and outlet openings;
   i) said second contiguous portion extending from said first contiguous portion downwardly to below said inlet and outlet openings such that one of said inlet and outlet openings is disposed within said closed volume and the other of said inlet and outlet openings is disposed outside said closed volume when said plug is in said closed position;
   j) said plug including a male member and a female member that cooperate with each other; and,
   k) said second seal being disposed in a groove formed between said male and female members.

2. A fluid valve as in claim 1, wherein:
   a) said groove includes a base wall and opposing side walls; and,
   b) said side walls are disposed inwardly towards each other such that each inside wall makes an acute angle with said base wall.

3. A fluid valve as in claim 1, wherein:
   a) said body includes an annular groove; and
   b) said plug includes an annular flange cooperating with said annular groove.

4. A fluid valve as in claim 1, wherein:
   a) said first and second seals include "O"-rings.

5. A fluid valve as in claim 1, wherein:
   a) said chamber and said plug are cylindrical in shape.

6. A fluid valve as in claim 1, wherein:
   a) said chamber and said plug are frusto-conical in shape.

7. A fluid valve, comprising:
   a) a body having a chamber and an inlet opening and an outlet opening communicating with said chamber;
   b) a plug being disposed within said chamber, said plug being rotatable within said chamber about an axis between a closed position and an open position;
   c) said plug including a passageway communicating with said inlet opening and said outlet opening when said plug is in said open position, thereby providing a flowpath for the fluid through said valve;
   d) said inlet opening, said outlet opening and said passageway being disposed along a straight axis when said plug is in said open position;
   e) first and second spaced apart "O"-rings disposed between said body and said plug, said "O"-rings defining therebetween and said body and said plug a closed volume on said plug without said passageway;
   f) said first "O"-ring being disposed above said inlet and outlet openings;
   g) said second "O"-ring consisting of first and second contiguous portions;
   h) said first contiguous portion being disposed below said first "O"-ring and above said inlet and outlet openings;
   i) said second contiguous portion extending from said first contiguous portion downwardly to below said inlet and outlet openings such that one of said inlet and outlet openings is disposed within said closed volume and the other of said inlet and outlet openings is disposed outside said closed volume when said plug is in said closed position;
   j) said plug including a male member and a female member that cooperate with each other; and,
   k) said second "O"-ring being disposed in a groove formed between said male and female members.

8. A fluid valve, as in claim 7, wherein:
   a) said first "O"-ring and said first contiguous portion are disposed substantially parallel to each other.

9. A fluid valve as in claim 7, wherein:
   a) said first "O"-ring and said first contiguous portion are disposed substantially traverse to the axis of rotation of said plug.

10. A fluid valve as in claim 7, wherein:
    a) said groove includes a base wall and opposing side walls; and,
    b) said side walls are disposed inwardly towards each other such that each inside wall makes an acute angle with said base wall.

11. A fluid valve as in claim 10, wherein:
    a) each of said side walls includes a lip portion disposed inwardly into said groove.

* * * * *